United States Patent [19]
Katoh et al.

[11] Patent Number: 5,687,017
[45] Date of Patent: Nov. 11, 1997

[54] ROTARY POLYHEDRAL MIRROR AND METHOD FOR PRODUCING THE MIRROR

[75] Inventors: Hiroaki Katoh; Ichiro Sebata, both of Kawasaki, Japan

[73] Assignee: Fujitsu Limited, Kawasaki, Japan

[21] Appl. No.: 662,156

[22] Filed: Jun. 12, 1996

[30] Foreign Application Priority Data

Sep. 11, 1995 [JP] Japan .................. 7-232587

[51] Int. Cl.⁶ .................. G02B 26/08; G02B 7/182
[52] U.S. Cl. .................. 359/216; 359/850; 359/855; 359/871; 359/900
[58] Field of Search .................. 359/216–218, 359/212, 850, 855, 871, 872, 900

[56] References Cited

U.S. PATENT DOCUMENTS

| | | | |
|---|---|---|---|
| 4,529,277 | 7/1985 | Gee et al. | 359/854 |
| 5,461,505 | 10/1995 | Nishikawa et al. | 359/216 |

*Primary Examiner*—James Phan
*Attorney, Agent, or Firm*—Armstrong, Westerman, Hattori, McLeland & Naughton

[57] ABSTRACT

A rotary polyhedral mirror includes a plurality of reflective surface portions and a connecting portion connecting the plurality of reflective surface portions, wherein the plurality of reflective surface portions and the connecting portion being integrally formed portions of a member which is subjected to a mirror surface treatment prior to the member is formed in a polyhedral shape.

13 Claims, 13 Drawing Sheets

HOOK OF A REFLECTIVE MIRROR PORTION

ROTARY POLYHEDRAL MIRROR AND METHOD FOR PRODUCING THE MIRROR

BACKGROUND OF THE INVENTION

1. Field of the Invention

The present invention generally relates to rotary polyhedral mirrors and methods for producing the mirrors, and particularly, to a rotary polyhedral mirror used in an optical scanning system which generates a scanning beam of an apparatus for reading optical marks or in a laser-beam printer, and a method for producing such mirror.

2. Description of the Related Art

Recently, control of commodities using an optical mark such as a bar code has been widespread among retail stores of many kinds. Accordingly, demand for a point-of-sale system (POS system) which is necessary for such a control of commodities has been increased.

In the POS system, an apparatus for reading optical marks such as a scanner having an optical scanning system is used and demand has increased for such apparatus in relation to an improvements in operability, reduction in size and low cost.

Also, laser-beam printers, in which electronic information is made visual by an optical scanning system using a laser beam, are widespread. In the above-mentioned optical scanning system, use of a rotary polyhedral mirror is required and a reduction in size and cost is also desired for such a mirror.

In the rotary polyhedral mirror, it is required that each of reflective surfaces accurately reflect the beam irradiated from a laser source to desirable directions in order to function properly.

In conventional rotary polyhedral mirrors, reflective surfaces are usually formed by carrying out a vacuum evaporation of metals such as aluminum onto a predetermined surface of a rotary polyhedral (e.g., hexagonal or octagonal) prism made of a synthetic resin, or by assembling mirror pieces made of glass or plastic.

In a process for producing the mirror-pieces-assembly-type rotary polyhedral mirror, the vacuum evaporation is carried out for a flat glass plate (mirror plate) and the plate is cut according to the desired shape for the reflective surface. Then each of the pieces of the cut plate is put on a respective reflective surface portion of a rotating base.

Such a rotary polyhedral mirror, therefore, has an excellent degree of flatness of the mirror surface due to the vacuum evaporation on the flat plate. However, a precise finishing is required for maintaining the weight balance of the device and the preciseness of reflective directions of the surface of the rotary mirror and, in addition, many manual steps must be included in the production process for the rotary polyhedral mirror.

Also, when constructing such rotary polyhedral mirrors, it is necessary to cut the mirror plate in accordance with each of the reflective surface fixing portions and carry out the finishing process. Moreover, the mirror pieces having passed the finishing process have to be fixed to each of the reflective surface portions of the rotating base by using an adhesive and so on.

As mentioned above, the mirror-pieces-assembly-type rotary polyhedral mirror is not suitable for mass production and its weight and cost tend to become large. Moreover, problems such as peeling off of a mirror or a generation of cracks in the mirror, which can result in a deterioration of the device, sometimes occur for the mirror-pieces-assembly-type rotatory mirror.

FIG. 1A is a diagram showing a perspective view of a conventional rotary polyhedral mirror. In FIG. 1A, the numeral 1 indicates a rotary polyhedron having six reflective surface portions 2 of a trapezoid shape. The rotary polyhedron 1 and the reflective surface portions 2 are molded together using a synthetic resin such as polycarbonate as the construction material.

FIG. 1B is a diagram showing a cross-sectional view of the conventional rotary polyhedral mirror shown in FIG. 1A. As shown in FIG. 1B, the rotary polyhedron 1 has a supporting member 3 fixed to a rotary shaft (not shown) by a shaft fixing portion 4. In addition, a hub 3 is formed at a vicinity of the center of the reflective surface portion 2.

It is necessary to carry out a mirror surface treatment such as a coating of the surface by aluminum using appropriate methods such as the vacuum evaporation for the rotary polyhedral mirror shown in FIGS. 1A and 1B.

In the conventional vacuum evaporation method for coating a resin mold, it is necessary to provide a treatment step, in which each of the reflective surface portions 2 faces toward an evaporation source so as to form a reflective coating on each of them with a predetermined uniform thickness.

In order to carry out the above-mentioned mirror surface treatment on a larger scale, it is necessary, for example, to support a number of molded polyhedrons 1 using rotating shafts 5, 6 . . . , so that one surface of the reflective surface portions of each of the polyhedrons directly faces the evaporation source provided in a vacuum evaporation apparatus as shown in FIG. 2 and repeat this surface treatment step according to the number of the reflective surfaces of the polyhedrons so that all surfaces are equally coated.

As mentioned above, in the conventional method, the vacuum evaporation process has to be carried out for each of the reflective surface portions by rotating a number of molded polyhedrons 1 and forming a coating on each of the reflective surface portions 2 one after another.

Moreover, when a resin mold having the above-mentioned structure is formed by injection molding and so on, for example, a contraction phenomenon, a so-called sink mark tends to be formed on a portion 5 of the reflective surface portion 2, shown in FIG. 1A, which corresponds to an end portion of the supporting member 3, and the degree of flatness of the reflective surface is lowered by the formation of such sink marks.

Since the portion which reflects an incoming laser beam is generally set in the vicinity of the center of the reflective surface, if a sink mark of even a small size is produced on the surface, the laser beam irradiated will be randomly reflected and an erroneous reading of an optical mark may be caused. Therefore, the yield of the rotary reflective mirror using such production method is low.

Another disadvantage of such a method for producing a rotary polyhedral mirror is that it is a time consuming process which requires not only a number of evaporation processes corresponding to the number of surfaces to be coated of a rotary polyhedron, but also the rotation process of the rotating shafts carried out between each of the coating steps.

Further, when the mirror surface treatment is carried out by rotating the polyhedrons, the resulting coating tends to be uneven in thickness for various portions of the reflective surface portions 2 and a difference in reflectivity tends to be created.

Further, the rotating shaft 5, 6 . . . are rotated in a direction indicated by an arrow 7 shown in FIG. 2 on some occasions in order to effectively produce a number of rotary polyhedral mirrors at the same time. For this reason, however, the system often becomes complicated.

SUMMARY OF THE INVENTION

It is a general object of this invention to provide a rotary polyhedral mirror and a method for producing the mirror in which the above-mentioned problems are eliminated.

A more specific object of the present invention is to provide a rotary polyhedral mirror used in an optical scanning system which generates a scanning beam of an apparatus for reading optical marks or in a laser-beam printer, and a method for producing such mirror.

Another object of the present invention is to provide a rotary polyhedral mirror wherein each of reflective surfaces accurately reflects the beam irradiated from a laser source to desirable directions.

Another object of the present invention is to provide a rotary polyhedral mirror which has an excellent degree of flatness of a mirror surface and hence reflectivity.

Another object of the present invention is to provide a method for effectively producing a rotary polyhedral mirror having simple producting steps by which a necessary precision for the resulting rotary polyhedral mirror is maintained.

The objects described above are achieved by a rotary polyhedral mirror comprising: a plurality of reflective surface portions; and a connecting portion connecting the plurality of reflective surface portions, wherein the plurality of reflective surface portions and the connecting portion being integrally formed portions of a member which is subjected to a mirror surface treatment prior to the member is formed in a polyhedral shape.

According to the above rotary polyhedral mirror, since the plurality of reflective surface portions and the connecting portion are integrally formed in a desirable shape and subjected to a mirror surface treatment prior to be formed in a polyhedral shape, each of the reflective surface portions may have a surface which is equally coated in thickness and has an excellent degree of flatness.

The objects described above are also achieved by the rotary polyhedral mirror further comprising a rotating body having surfaces on which the plurality of reflective surface portions are respectively positioned so as to be inclined at a predetermined angle to an incident light.

According to the above rotary polyhedral mirror, the angle of each of the plurality of reflective surface portions may easily be adjusted by the rotating body.

The objects described above are also achieved by the rotary polyhedral mirror wherein the rotating body comprises means for positioning each of the plurality of reflective surface portions.

According to the above rotary polyhedral mirror, each of the plurality of reflective surface portions may be easily positioned.

The objects described above are also achieved by the rotary polyhedral mirror wherein the rotating body comprises a projection which prevents a shift of the plurality of reflective surface portions.

According to the above rotary polyhedral mirror, since shift of the plurality of reflective surface portions may be prevented, a stable light reflection property of the apparatus may be obtained.

The objects described above are also achieved by the rotary polyhedral mirror wherein the plurality of reflective surface portions are portions defined by bending the member.

The objects described above are also achieved by the rotary polyhedral mirror wherein the plurality of reflective surface portions are arranged in a petal shape.

According to the above rotary polyhedral mirror, since a contraction phenomenon, a so-called sink mark is not caused around a center of the reflective surface portion, the degree of flatness of the reflective surface is not lowered and an incident light may be accurately reflected.

The objects described above are also achieved by the rotary polyhedral mirror wherein each of the plurality of reflective surface portions comprises at least one protruding portion which defines an angle of the reflective surface portions at its back.

According to the above rotary polyhedral mirror, the angle of each of the reflective surface portions may easily be defined.

The objects described above are also achieved by the rotary polyhedral mirror further comprising a fixing ring for preventing the plurality of reflective surface portions from opening up.

According to the above rotary polyhedral mirror, the plurality of reflective surface portions may be firmly fixed and an incident light may be accurately reflected.

The objects described above are also achieved by the rotary polyhedral mirror wherein the plurality of reflective surface portions are arranged in a peripheral direction of the rotating body.

According to the above rotary polyhedral mirror, it can be applied to a device, in which a demand for accurate reflection is high, such as a laser-beam printer.

The objects described above are also achieved by the rotary polyhedral mirror further comprising connecting members which connect each of the plurality of reflective surface portions, wherein the size of each of the connecting members is smaller than that of each of the reflective surface portions in order to make it possible to adjust an angle of each of the reflective surface portions.

According to the above rotary polyhedral mirror, the angle of each of the reflective surface portions may be easily adjusted by the connecting member.

The objects described above are also achieved by the rotary polyhedral mirror wherein the rotating body further comprises means for adjusting the angle of the plurality of reflective surface portions.

According to the above rotary polyhedral mirror, the angle of each of the reflective surface portions may be easily adjusted by the means provided with the rotating body.

The objects described above are also achieved by the rotary polyhedral mirror wherein each of the plurality of reflective surface portions comprises a structural material member at its back so that the plurality of reflective surface portions can be directly fixed to a rotating portion of a motor.

According to the above rotary polyhedral mirror, since the plurality of reflective surface portions are directly fixed to the rotating portion of a motor, the number of parts required for constructing the device may be decreased and therefore the cost necessary for producing the rotary polyhedral mirror can also be decreased.

The object described above is also achieved by a method for producing a rotary polyhedral mirror comprising a plurality of reflective surface portions, the method comprising the steps of: (A) integrally forming the plurality of reflective surface portions in a unfolded state, (B) simultaneously providing each of the plurality of reflective surface portions integrally formed with a reflective material in the unfolded state, and (C) folding each of the plurality of reflective surface portions.

According to the above method for producing a rotary polyhedral mirror, since the plurality of the respective surface portions of the member are formed in the unfolded state and has a desirable shape, it is not necessary to cut each of the reflective surface portions into a desirable shape at a later stage and therefore the process may be simplified.

According to the above method for producing a rotary polyhedral mirror, it is easy to improve the precision of various parts of the rotary polyhedral mirror such as a degree of flatness of each of the plurality of reflective surfaces and therefore preparatory steps for the vacuum evaporation, which are necessary in general, may be significantly simplified.

According to the above method for producing a rotary polyhedral mirror, coating of the plurality of reflective surfaces may be carried out simultaneously without rotating the member since all of the reflective surfaces are facing the same direction and positioned in a common plane. Thus, mirror surface treatment steps may be simplified and accordingly the time required for the steps is reduced. Further, since each of the reflective surface portions is coated at the same time as mentioned above, uniform thickness of the coating for each of the reflective surface portions may easily be obtained and the yield of the device can be significantly increased. Thus, the cost necessary for producing the rotary polyhedral mirror may be largely decreased.

Further, according to the above method for producing the rotary polyhedral mirror of the present invention, the number of steps necessary for producing the rotary polyhedral mirror is decreased and the steps per se are simplified. Moreover, the number of steps which require special techniques or skilled labor is also decreased.

Other objects and further features of the present invention will be apparent from the following detailed description when read in conjunction with the accompanied drawings.

DESCRIPTION OF THE PREFERRED EMBODIMENTS

In the following, a principle and embodiments of the present invention will be described with reference to the accompanying drawings.

First, a description will be given of a first embodiment of a rotary polyhedral mirror according to the present invention produced by using a method for producing a rotary polyhedral mirror, which is also according to the present invention.

Figure 1A:
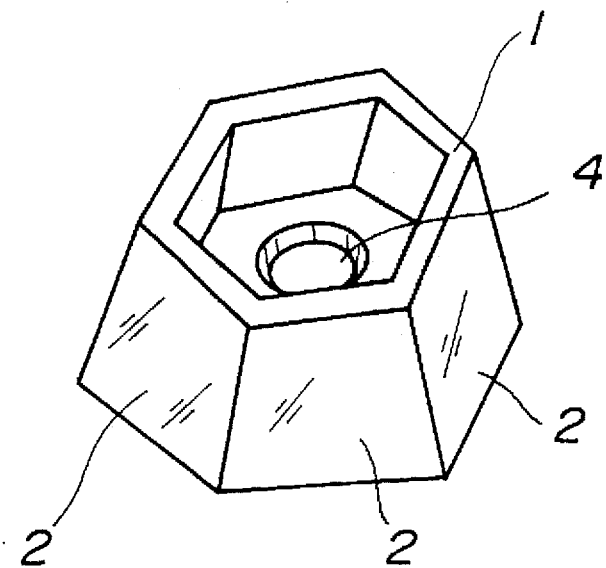
FIG. 1A is a perspective view showing a structure of a conventional rotary polyhedral mirror.
Figure 1B:
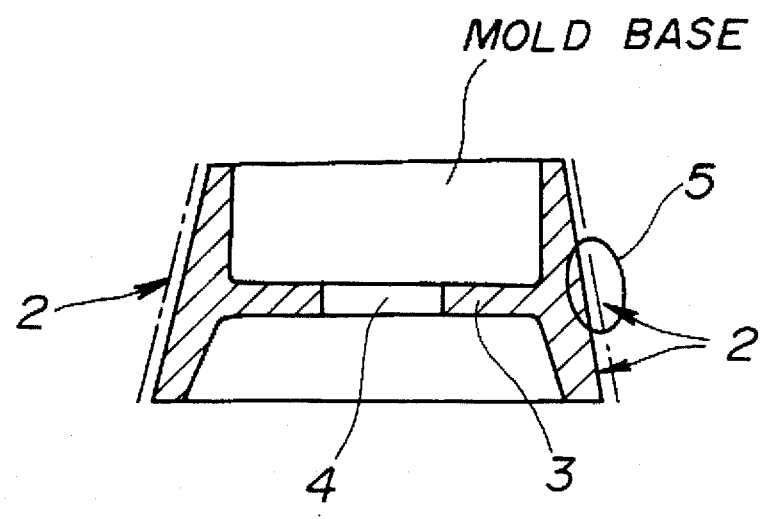
FIG. 1B is a cross-sectional view showing a structure of a conventional rotary polyhedral mirror shown in FIG. 1A.
Figure 2:
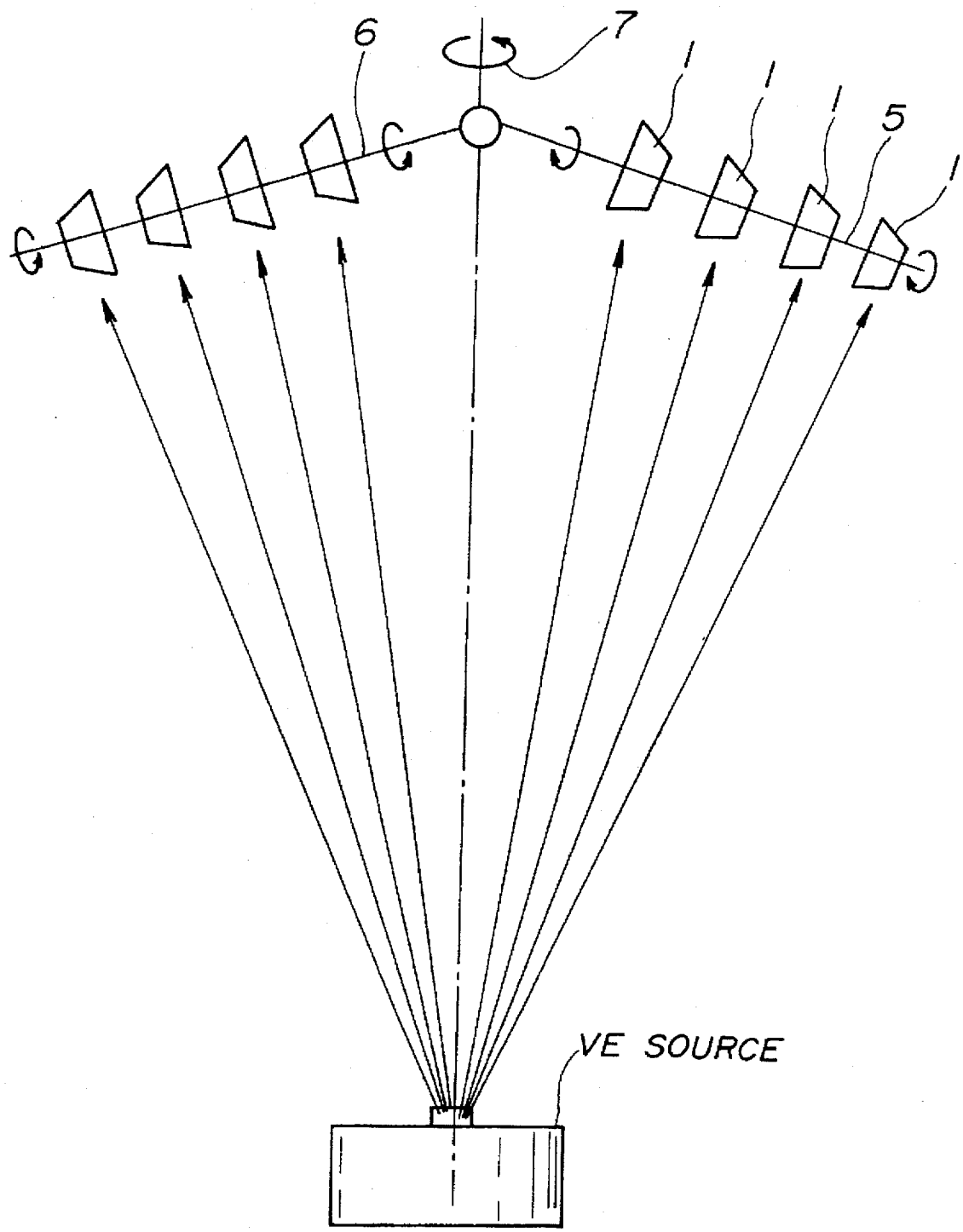
FIG. 2 is a diagram showing a process of conventional mirror surface treatment for a number of rotary polyhedral mirrors.
Figure 3A:
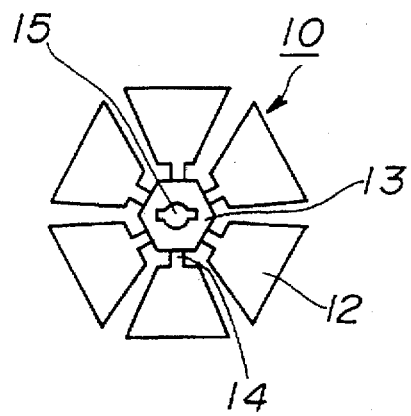
FIG. 3A is a diagram showing a resin member of the present invention which is integrally molded.
Figure 3B:
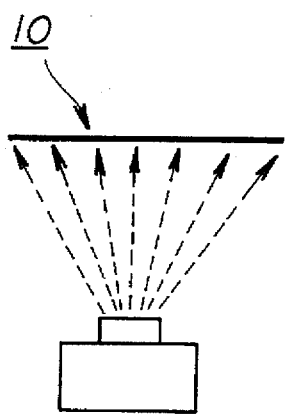
FIG. 3B is a diagram for explaining a mirror surface treatment of the resin member shown in FIG. 3A.
Figure 3C:
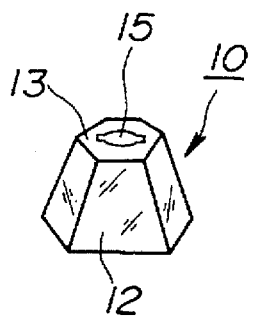
FIG. 3C is a diagram showing an assembled rotary polyhedral mirror according to the present invention.

FIGS. 3A to 3C are diagrams showing main steps of the method for producing the rotary polyhedral mirror according to the present invention. In FIG. 3A, a resin member 10, which has been molded in an unfolded state, for forming reflective surface portions and connecting portion of the rotary polyhedral mirror is shown.

According to the method for producing a rotary polyhedral mirror of the present invention, the resin member 10 having multiple (six, eight, etc.) reflective surface portions 12 around a hub 13 is formed in an unfolded state. Each of the reflective surface portions 12 is connected with the hub 13 by a connecting member 14 as shown in FIG. 3A.

In FIG. 3B, a mirror surface treatment according to the present invention is shown. In the figure, the resin member 10 faces a vacuum evaporation source with each of the reflective surface portions 12 in the unfolded state and the evaporation of reflective coating is carried out for each of the reflective surface portions 12 at the same time.

Then, each of the reflective surface portions 12, on which the reflective coating has been formed, of the resin member 10 is assembled into a rotary polyhedral mirror as shown in FIG. 3C using appropriate construction supporting members which are not shown in the figure.

According to such a method, since the reflective surface portions of the member are in the unfolded state and in a predetermined flat shape from the beginning of construction, there is no need to cut the surface portions into a desirable shape at a later stage. Thus, the process may be simplified.

Also, for the same reason as above, it is easy to improve the degree of flatness of the reflective surfaces or the precision of various parts of the member. Thus, preparatory steps for the vacuum evaporation, which are necessary in general, may be significantly simplified.

Figure 4:
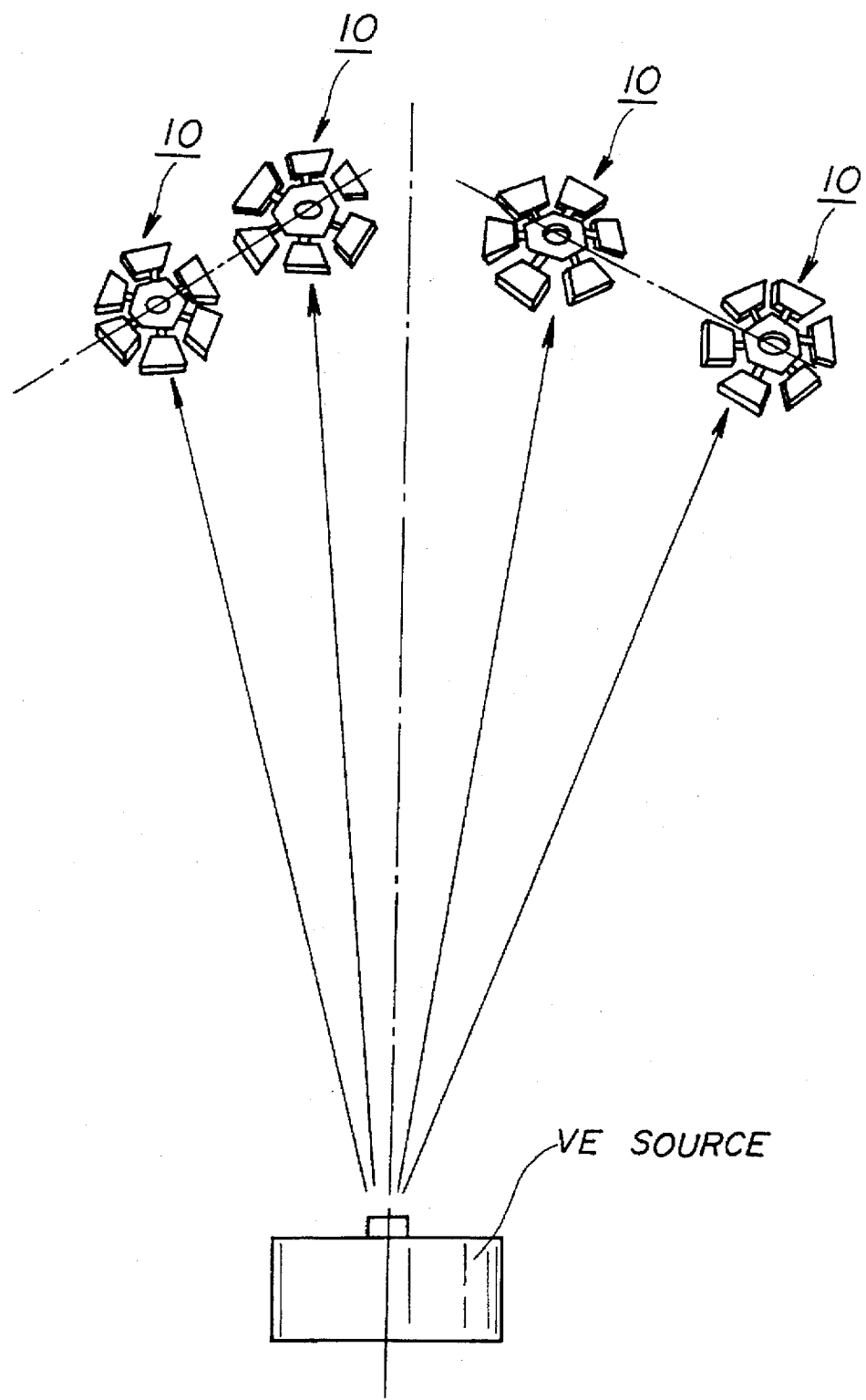
FIG. 4 is a diagram for explaining a mirror surface treatment step according to the present invention.

Moreover, according to the present invention, the mirror surface treatment for forming a plurality of reflective surface coatings may be carried out without moving a plurality of members 10 as shown in FIG. 4. That is, it is not necessary to rotate a plurality of members 10 during the vacuum evaporation process and, in addition to that, all of the reflective surface portions may be coated at the same time as they are positioned in a common plane. Thus, the mirror surface treatment step may be simplified and accordingly the time required for the step can be reduced. Further, since each of the reflective surface portions is coated at the same time as mentioned above, uniform thickness of the coating may easily be obtained and the yield of the device can be significantly increased. Thus, the cost necessary for producing the rotary polyhedral mirror may be largely decreased.

As mentioned above, according to the method for producing the rotary polyhedral mirror of the present invention, the number of steps necessary for producing the mirror is decreased and the steps per se are simplified. Moreover, the number of steps which require special techniques or skilled hand labor is also decreased.

Materials which may be used for the resin member 10 of the present invention are not limited and various functional resins, so-called engineering plastics, or any resins which have a characteristic of an excellent dimensional stability and of being easily coated during the evaporation process can be used. Examples of the materials used for the resin member 10 include a resin alloy in which polycarbonate or other resins are mixed in an appropriate ratio. Various stabilizers, fire retardants and/or fillers can be added to the resin material.

The vacuum evaporation for forming the reflective surfaces carried out in the mirror surface treatment step may be a physical vacuum evaporation. However, other processes, for example, a chemical vacuum evaporation, can also be used.

Figure 5:
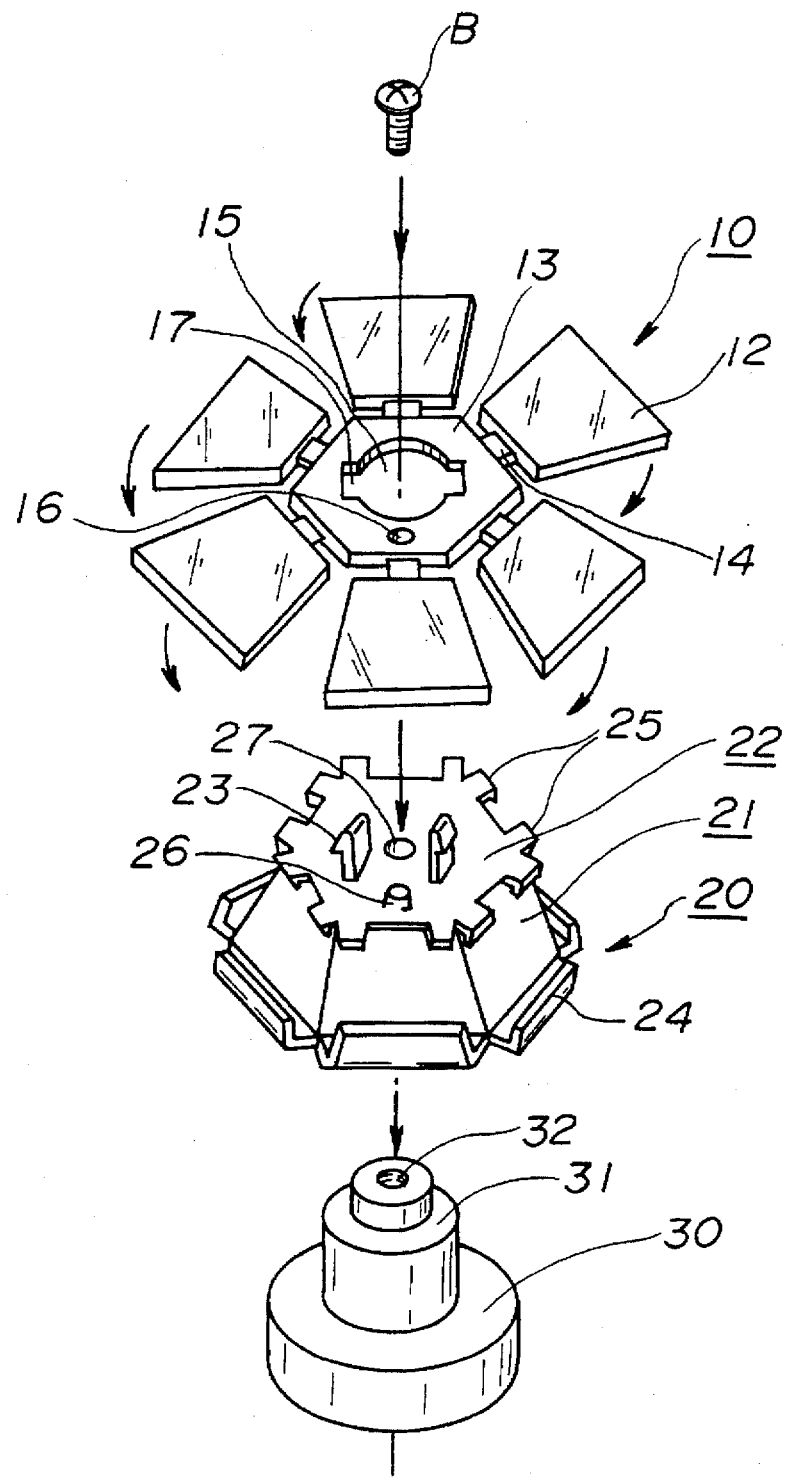
FIG. 5 is a diagram showing an exploded view of the rotary polyhedral mirror according to a first embodiment of the present invention.

FIG. 5 is a diagram showing an exploded view of the rotary polyhedral mirror according to a first embodiment of the present invention, having a so-called petal-shape member 10 which forms radial reflective surface portions. As shown in FIG. 5, since each of the reflective surface portions 12 of the rotary polyhedral mirror of the present invention is flat and no supporting member or the like is connected to its back, the sink or shrink marks will not be produced on it and hence there is little possibility that the function of the surface to reflect the laser beam in a correct direction is deteriorated.

The member 10 has, in this embodiment, six reflective surface portions 12 around the hub 13. Each of the reflective surface portions 12 is connected with the hub 13 by the connecting member 14. As mentioned above, the reflective surface portions 12 are integrally formed in a predetermined shape at the forming step.

The connecting member 14 has a thickness thinner than that of the reflective surface portion 12 or of the hub 13 and its width is narrow. Therefore, it can be easily folded.

Each of the reflective surface portions of the member 10 of the petal shape is folded after the member 10 is fixed to a rotating body 20. The rotating body 20 consists essentially of a main body 21 and an upper member 22 having a hexagonal shape.

The main body 21 used in this embodiment is hollow and has a reflective surface holding member 24 at a lower end of each of the side surfaces as shown in FIG. 5. At top of the main body 21, there is provided a pair of upper hooks 23 for fixing the upper member 22 and the member 10.

The upper member 22 has side hooks 25, two of which extending from each of its sides. The upper member 22 also has a projection 26 for positioning the member 10 and a central hole 27. The upper member is placed on the main body 21 and fixed to a predetermined position by the upper hooks 23.

At a lower hollow portion of the main body 21, there is provided a rotating portion 31 of a motor 30 which supplies a driving force for the rotary polyhedral mirror of the present invention. The motor 30 is rotated at a predetermined speed under the control of a control circuit which is not shown in the figure.

At the top surface of the rotating portion 31 of the motor 30, a screw hole 32 for a screw B shown in the figure is provided.

When the rotary polyhedral mirror according to the present invention is constructed, the rotating body 20 comprising the main body 21 and the upper member 22 is put on the rotating portion 31 of the motor 30 in a combined state. Then, the projection 26 on the upper member 22 is engaged with a small hole 16 provided in the hub 13 of the member 10 and each of the reflective surface portions 12 of the member 10 having a reflective coating is folded downwardly so that its end portion is hooked by a respective reflective surface holding member 24 of the main body 21.

On the other hand, the upper end portion of each of the reflective surface portions 12 is fixed by a pair of the side hooks 25 extending from the respective side of the upper member 22.

A pair of cut portions 17 positioned successively to the central hole 15 formed so as to be facing each other is engaged with the upper hooks 23 of the main body 21 so that the member 10 is fixed to the rotating body 20.

After each of the parts of the rotary polyhedral mirror is assembled as mentioned above, the upper member 22 and the main body 21 are fixed to the rotating portion 31 of the motor 30 by the screw B. As a result, the member 10, the upper member 22 and the main body 21 are all fixed to the rotating portion 31 of the motor 30 and the rotary polyhedral mirror according to the first embodiment of the present invention is produced.

Figure 6:
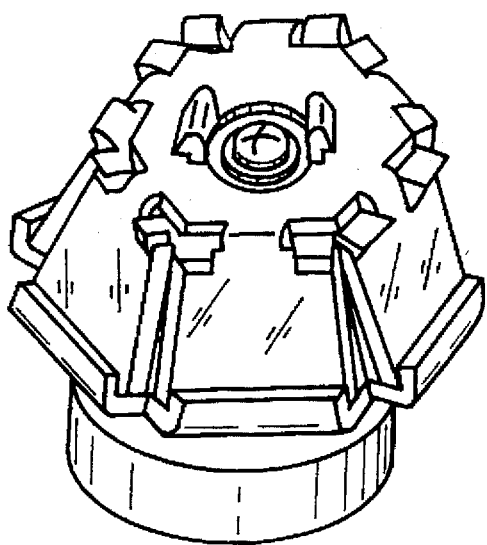
FIG. 6 is a diagram showing a perspective view of the rotary polyhedral mirror according to the first embodiment of the present invention.

FIG. 6 is a diagram showing a perspective view of the rotary polyhedral mirror according to the first embodiment of the present invention after all the assembling work are completed. It is preferable that the weight of each part of the mirror is calculated beforehand so that an appropriate rotation balance may be maintained for the device after the construction.

Also, it is possible to fix each of the reflective surface portions, without using the connecting member 14, by using hooks, for example, and in this way it becomes possible to use a rigid-type resin and so on as the material for forming the member.

Figure 7:
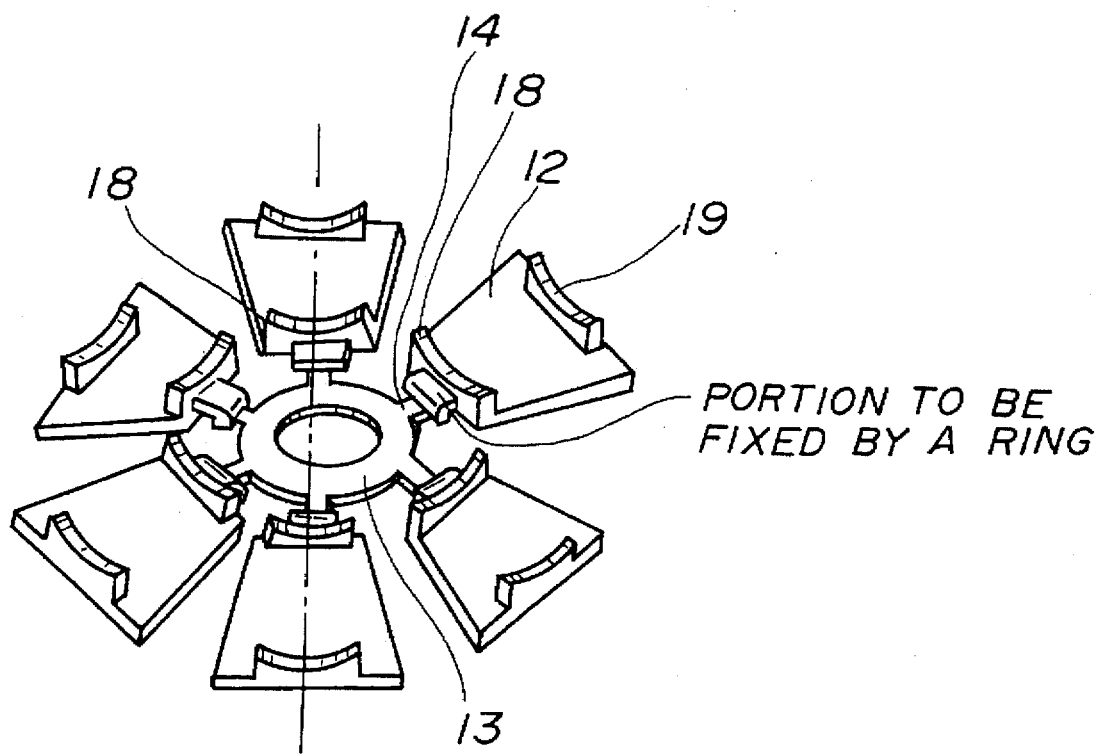
FIG. 7 is a diagram showing the other side of a member having six reflective surface portions according to a second embodiment of the present invention.

FIG. 7 is a diagram showing a member 10 having six reflective surface portions 12 according to second embodiment of the present invention. In FIG. 7, the back side of the member 10 is shown and elements which are the same as the ones in FIG. 5 are indicated by the same reference numerals.

The member 10 has an upper protruding portion 18 and a lower protruding portion 19 provided at the back of upper and lower ends, respectively, of each of the reflective surface portions 12. The upper and lower protruding portions 18 and 19, respectively, contact the rotating portion 31 of the motor 30 and function not only to precisely adjust the angle of the reflective surface portions 12 but also to maintain a rotation balance of the device.

The upper protruding portion 18 and the lower protruding portion 19, respectively, are formed to be suitable shapes for the rotating portion 31 of the motor 30. The height of the upper protruding portion 18 and that of the lower protruding portion 19 are appropriately changed in order to obtain a proper angle of the reflective surface portions 12.

Since the positions of both the upper and lower protruding portions 18 and 19 are well apart from the center of the reflective surface, even if sink marks are caused by the protruding portions 18 and 19, they will not substantially affect the performance of the device.

Figure 8:
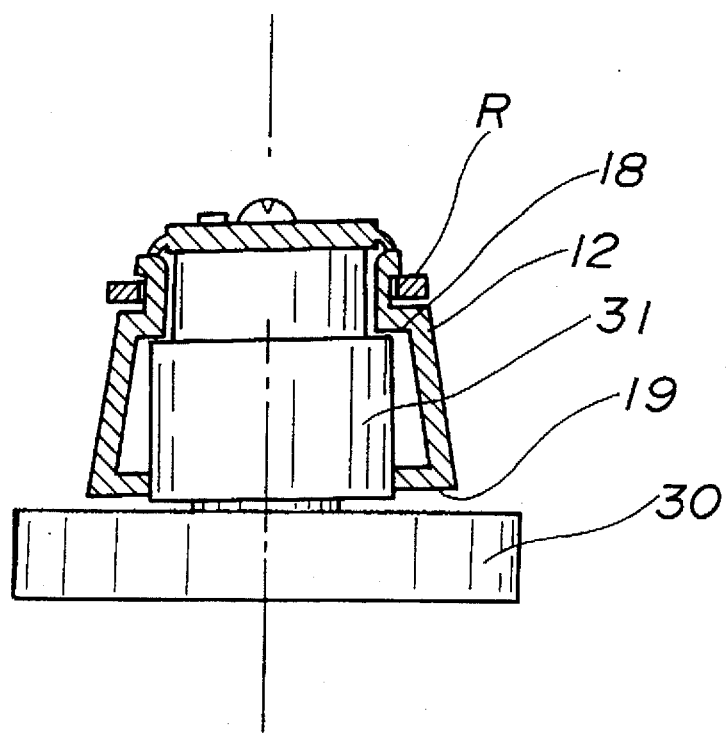
FIG. 8 shows a cross-sectional view of the rotary polyhedral mirror according to the second embodiment of the present invention.

FIG. 8 shows a cross-sectional view of the rotary polyhedral mirror, in which the member 10 shown in FIG. 7 is used, according to the second embodiment of the present invention. In FIG. 8, a fixing ring R is provided around the connecting members 14 of each of the reflective surface portions 12 so that the entire member 10 is fixed, without using a screw or the like, to the rotating portion 31 of the motor 30 and the upper and lower protruding portions 18 and 19, respectively, closely contact to the outer periphery of the rotating portion 31.

As shown in the figure, the rotating portion 31 is formed as a combination of two cylinders, each having a different diameter, with a distinctive step between the two. For this reason, a fixing portion of the member 10 which fits an upper cylinder portion of the rotating portion 31 will not move in the lower direction. In other words, the step between the two cylinders prevents the member 10 from moving downwardly.

Figure 9:
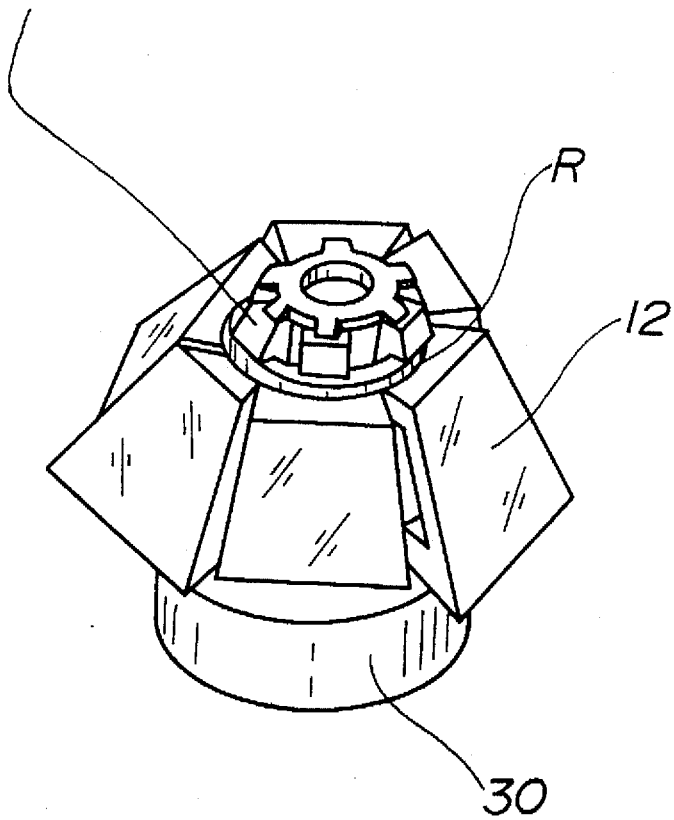
FIG. 9 is a diagram showing a perspective view of the rotary polyhedral mirror according to the second embodiment of the present invention.

FIG. 9 is a diagram showing a perspective view of the rotary polyhedral mirror according to the second embodiment of the present invention. In FIG. 9, the folded reflective surface portions 12 are surrounding the rotating portion 31 of the motor 30 and the member 10 is fixed by the fixing ring R.

Figure 10:
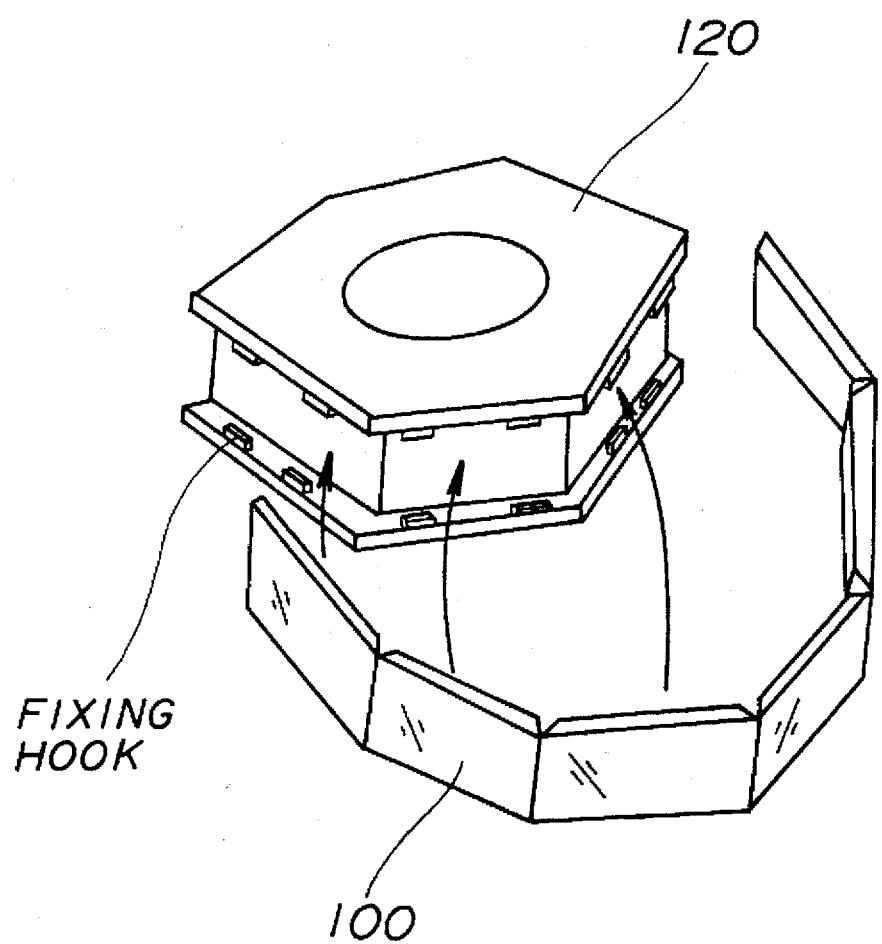
FIG. 10 is a diagram showing a perspective view of a third embodiment of the rotary polyhedral mirror according to the present invention.

FIG. 10 is a diagram showing a third embodiment of the present invention in which reflective surface portions are integrally formed in the shape as shown in the figure. This embodiment applies to a case where a narrower range of scanning, compared with the cases of the first and second embodiments, is required. In FIG. 10, the reflective surface portion 100 is folded along the sides of a rotary polyhedron 120 of a hexagonal shape. The reflective surface portion 100 contacts each side of the rotary polyhedron 120 and is fixed by fixing hooks provided at each side of the rotary polyhedron 120. Such a rotary polyhedron mirror is used, for example, for an optical scanning system of a laser-beam printer.

That is, for the laser-beam printer, it is advantageous to provide reflective surfaces around the periphery of the rotary polyhedron as shown in the figure in order to equalize the angle of each reflective surface so that a scanning position of a reflective beam can be kept within a predetermined range.

Figure 11:
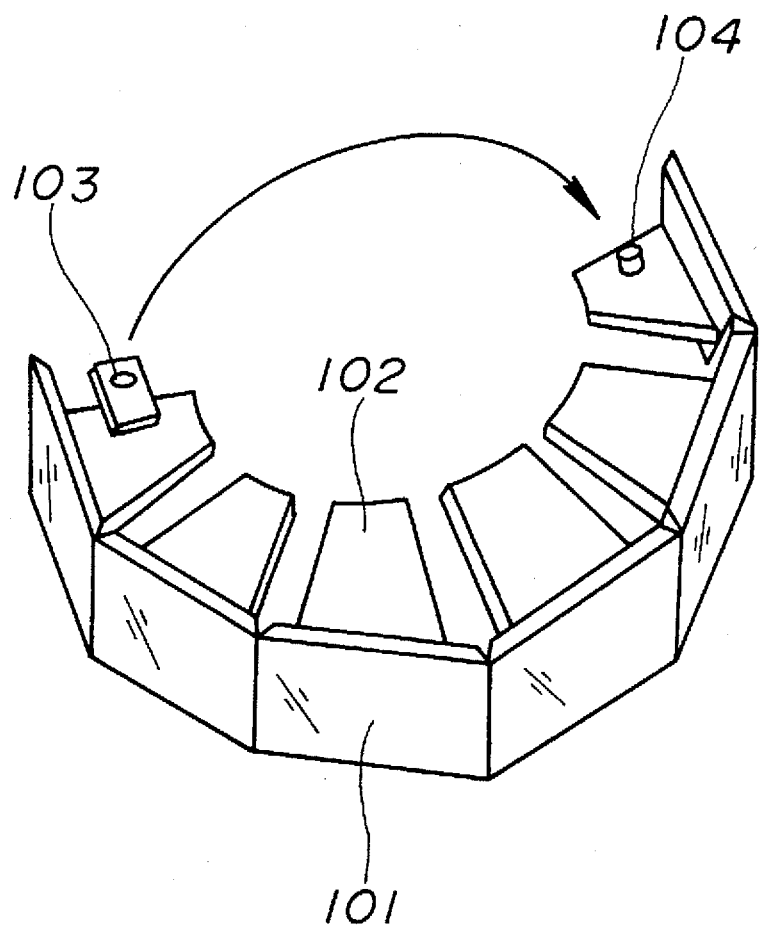
FIG. 11 is a diagram showing a perspective view of a fourth embodiment of the rotary polyhedral mirror according to the present invention.

FIG. 11 is a diagram for explaining a fourth embodiment according to the present invention. In this embodiment, a structural material member 102 which is provided at the back of the reflective surface portion 101 and can be attached directly to the rotating portion of the motor is used. As shown in the figure, it is possible to provide a joint 103 and a jointing projection 104 on the structural material member 102 on opposite ends of the reflective surface portions 101, respectively, so that they may be jointed to fix the reflective surface portions 101 to the rotating portion of the motor. In addition, the shape of an inner end portion of the structural material members 102 which contact the rotating portion is formed so as to be suitable for the rotating portion.

Figure 12A:
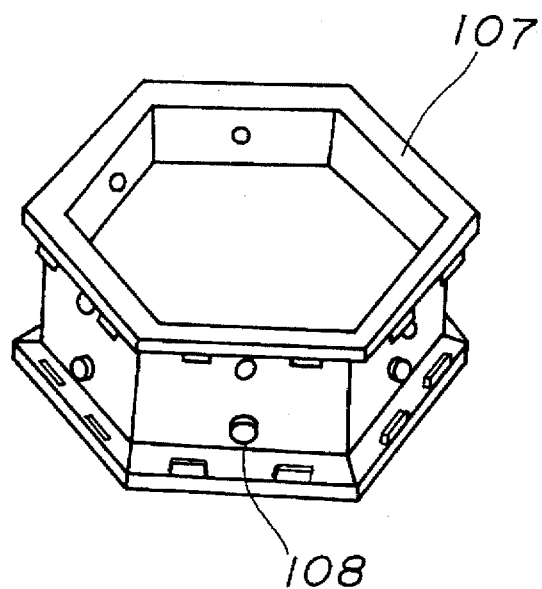
FIG. 12A is a diagram showing a perspective view of a rotary polyhedron according to the fifth embodiment of the present invention.
Figure 12B:
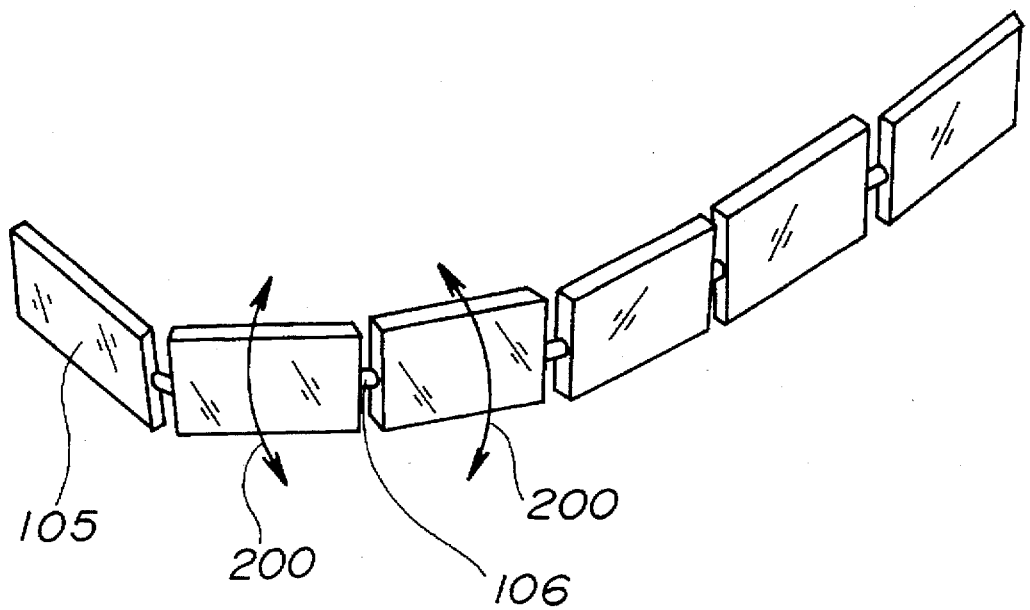
FIG. 12B is a diagram for explaining a reflective surface portion according to the fifth embodiment of the present invention.

FIGS. 12A and 12B are diagrams for explaining a fifth embodiment according to the present invention wherein an angle adjusting mechanism for adjusting the angle of each reflective surface portion, as indicated by an arrow in FIG. 12B, is further provided. In FIG. 12A, it is shown that an angle adjusting screw 108 is provided on each of fixing surfaces of the rotary polyhedron 107. In FIG. 12B, reflective surface portions 105 which are connected with each other by a connecting member 106 are shown. The connecting member 106 used in this embodiment is made smaller so that each of the reflective surface portions 105 may easily move in the directions indicated by the arrows 200.

The angle adjusting screw 108 contacts the other side of the reflective surface portion 105 and the angle of the reflective surface portion 105 can be adjusted by moving the screw 108 back and forth. In this way, the angle of each of the reflective surface portions 105 can be freely adjusted and a fine adjustment of the angle also become possible. Thus, the rotary polyhedral mirror according to this embodiment of the present invention can be applied to a device, in which a demand for accurate reflection is high, such as a laser-beam printer.

Also, as mentioned above, the surface area of the connecting member 106 is made small in this embodiment so that the connecting member 106 can be twisted and the angle of the reflective surface portion 105 can be freely varied to some degree. Thus the adjustment of the angle of the reflective portion 105 may be carried out easily.

Figure 13:
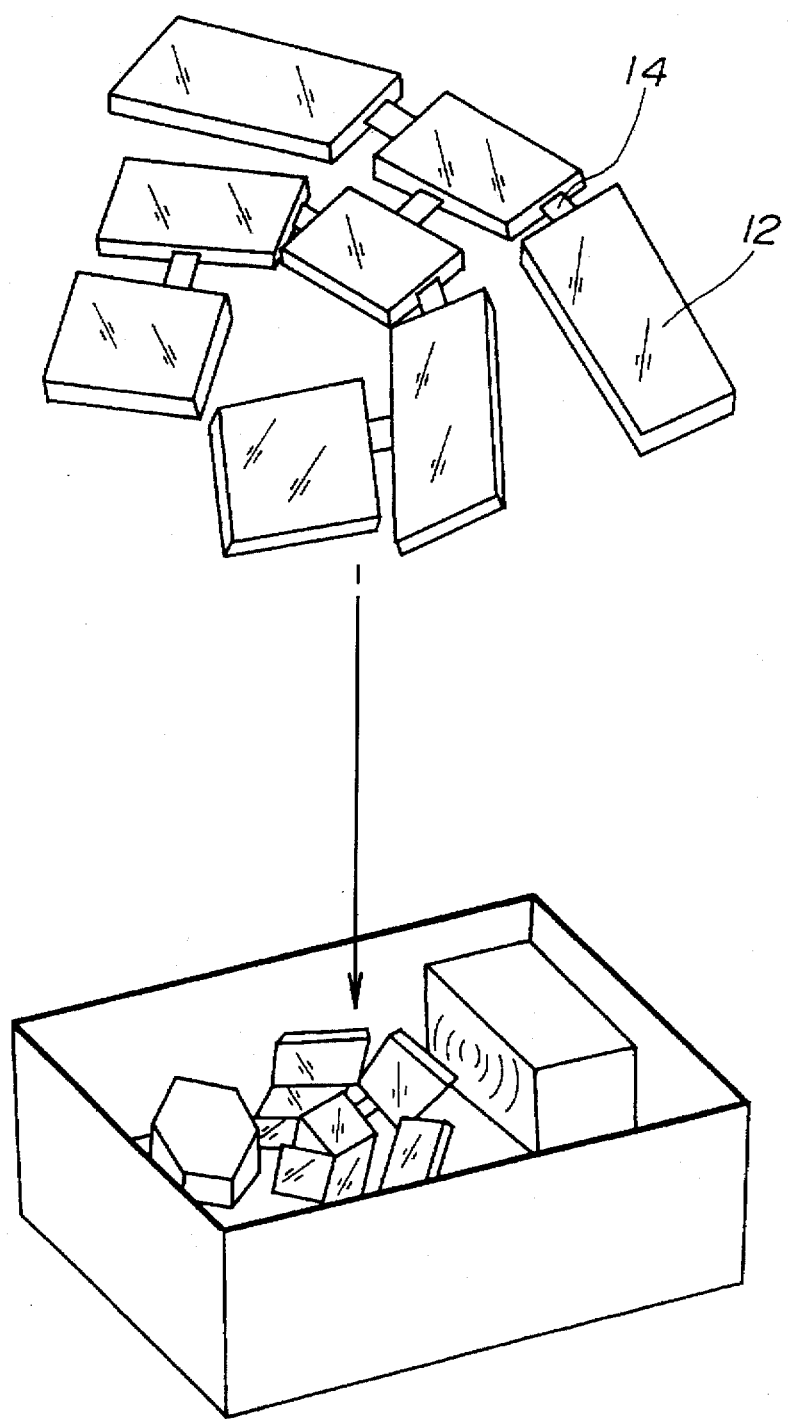
FIG. 13 is a diagram for explaining a formation of a pattern mirror to be provided with a bar-code reader.

FIG. 13 is a diagram for explaining a formation of a pattern mirror provided in a bar-code reader. In general, a pattern mirror for producing a plurality of scanning beams by reflecting a reflective beam from the rotary polyhedral mirror is provided in a bar-code reader as shown in FIG. 13. In the figure, the pattern mirror comprising a total of eight reflective surface portions is shown.

The method for producing a rotary polyhedral mirror according to the present invention can also be applied to the formation of the pattern mirror shown in FIG. 13. Various resin materials as mentioned above may also be used for the pattern mirror.

As shown in FIG. 13, eight reflective surface portions 12 of the pattern mirror are connected by connecting members 14 and form the pattern mirror having a common plane.

When such a pattern mirror is formed, a mirror surface treatment such as vacuum evaporation is carried out for the unfolded state of the pattern mirror. Since each of the reflective surface portions 12 is facing the same direction, it is possible to perform the vacuum evaporation and the like for each of the reflective surface portions 12 at the same time.

Then the connecting members 14 are folded or cut apart and the pattern mirror is set in the bar-code reader. In the bar-code reader, inclined surfaces each of which having a predetermined angle for the respective reflective surface portion 12 are provided so that a required reflective angle is secured for the corresponding reflective surface portion 12 of the pattern mirror.

Since each of the reflective surface portions 12 of the pattern mirror is formed in a shape which is suitable for the respective reflective surface fixing portion of the bar-code reader, there is no need to carry out a mirror cutting step and the like. Thus, according to the present invention, the number of steps necessary for assembling the pattern mirror can be decreased compared with the conventional methods.

It is obvious that the present invention is not limited to these embodiments, and variations and modifications may be made without departing from the scope of the present invention.

What is claimed is:

1. A rotary polyhedral mirror comprising:

a plurality of reflective surface portions; and connecting portion connecting said plurality of reflective surface portions, wherein said plurality of reflective surface portions and said connecting portion being integrally formed portions of a member which is subjected to a mirror surface treatment prior to said member is formed in a polyhedral shape.

2. The rotary polyhedral mirror as claimed in claim 1, wherein said plurality of reflective surface portions are portions defined by bending said member.

3. The rotary polyhedral mirror as claimed in claim 1, further comprising a rotating body having surfaces on which said plurality of reflective surface portions are respectively positioned so as to be inclined at a predetermined angle to an incident light.

4. The rotary polyhedral mirror as claimed in claim 3, wherein said rotating body comprises means for positioning each of said plurality of reflective surface portions.

5. The rotary polyhedral mirror as claimed in claim 3, wherein said rotating body comprises a projection which prevents a shift of said plurality of reflective surface portions.

6. The rotary polyhedral mirror as claimed in claim 3, wherein said plurality of reflective surface portions are arranged in a peripheral direction of said rotating body.

7. The rotary polyhedral mirror as claimed in claim 6, further comprising connecting members which connect each of said plurality of reflective surface portions, wherein size of each of said connecting members is smaller than that of each of said reflective surface portions in order to make it possible to adjust an angle of each of said reflective surface portions.

8. The rotary polyhedral mirror as claimed in claim 6, wherein said rotating body further comprises means for adjusting the angle of said plurality of reflective surface portions.

9. The rotary polyhedral mirror as claimed in claim 6, wherein each of said plurality of reflective surface portions comprising a structural material member at its back so that said plurality of reflective surface portions can be directly fixed to a rotating portion of a motor.

10. The rotary polyhedral mirror as claimed in claim 1, wherein said plurality of reflective surface portions are arranged in a petal shape.

11. The rotary polyhedral mirror as claimed in claim 1, wherein each of said plurality of reflective surface portions comprises at least one protruding portion which defines an angle of said reflective surface portions at its back.

12. The rotary polyhedral mirror as claimed in claim 1, further comprising a fixing ring for preventing said plurality of reflective surface portions from opening up.

13. A method for producing a rotary polyhedral mirror comprising a plurality of reflective surface portions, said method comprising the steps of:

(A) integrally forming said plurality of reflective surface portions in a unfolded state, (B) simultaneously providing each of said plurality of reflective surface portions integrally formed with a reflective material in the unfolded state, and (C) folding each of said plurality of reflective surface portions.

* * * * *